UNITED STATES PATENT OFFICE.

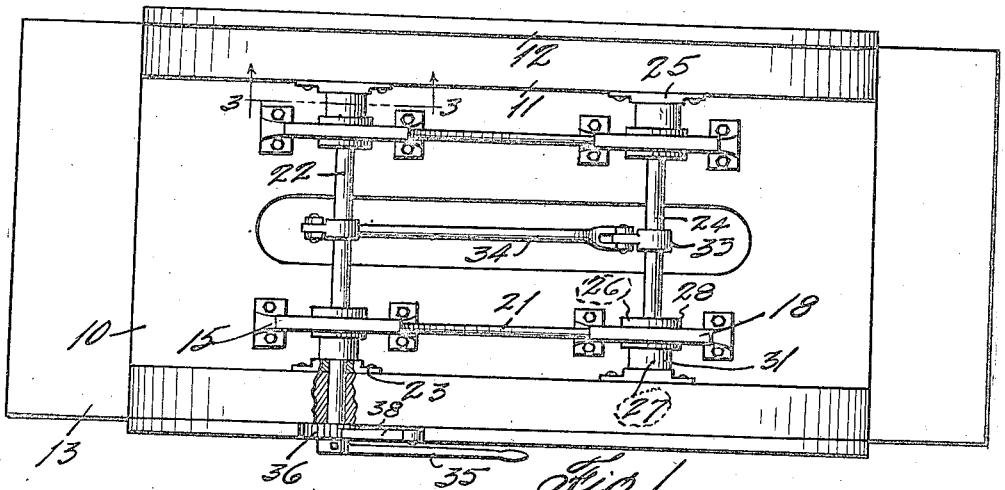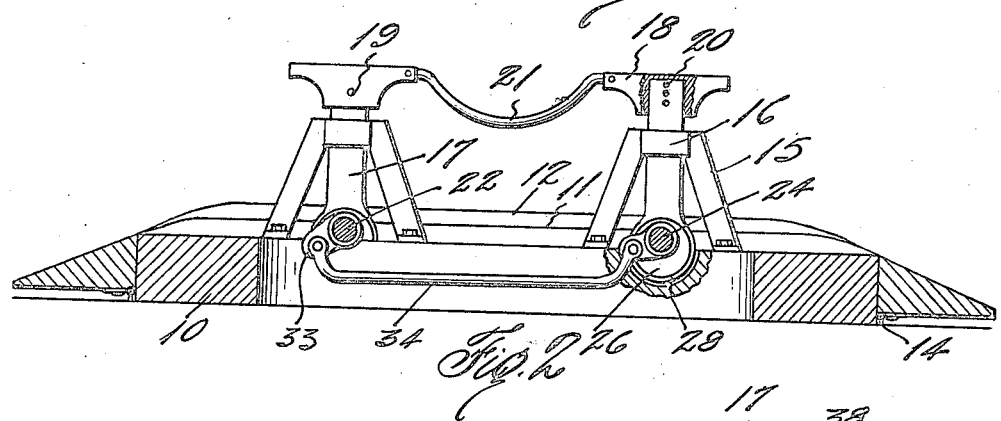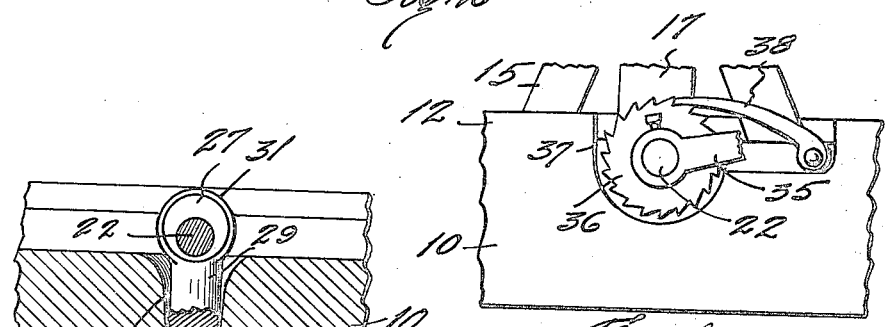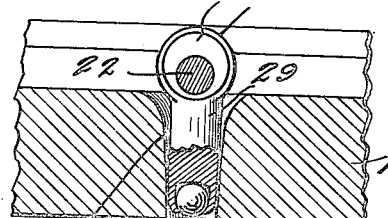

ANDY SHUSTER, OF SAN ANTONIO, TEXAS.

AUTOMOBILE TURNTABLE.

1,426,679.     Specification of Letters Patent.    Patented Aug. 22, 1922.

Application filed June 6, 1921. Serial No. 475,301.

*To all whom it may concern:*

Be it known that I, ANDY SHUSTER, a citizen of the United States, residing at San Antonio, in the county of Bexar and State of Texas, have invented certain new and useful Improvements in Automobile Turntables, of which the following is a specification.

This invention relates to new and useful improvements in automobile turn tables.

The object of the invention is to provide a turn table arranged to rest upon the floor of the garage so that the automobile may be driven onto the table and elevated so as to take the weight off of the tires, and the table then elevated so that it may be turned around or moved from place to place. A particular feature of the invention resides in a double eccentric which permits the raising of the automobile and the elevating of the table by a single operation. Another feature resides in means whereby the device is operated from one point by means of a single operating device.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is a plan view of a turn table constructed in accordance to my invention, Fig. 2 is a longitudinal vertical sectional view of the same, Fig. 3 is a cross sectional view on the line 3—3 of Fig. 1, and Fig. 4 is a detail of the pawl and ratchet operating mechanism.

In the drawings the numeral 10 designates a rectangular platform having elevated tracks 11 along each edge, which latter have upstanding guard rails 12 along their outer edges. Inclined approaches 13 are hinged at each end of the platform by means of suitable spring hinges 14, whereby said approaches are normally held slightly above the surface on which the platform rests. Two pair of standards 15 are mounted on the platform between the tracks 11. Each standard has a guide collar 16 at its upper end preferably rectangular in shape so as to receive a vertical bar member 17. Each member 17 telescopes at its upper end into an elongated head 18 and receives a transverse bolt 19 in one of the series of holes 20. By this arrangement the head may be vertically adjusted independently of the members 17. The head 18 of each pair of standards or lifting devices are connected with the heads of the other pair by a loop 21, whereby rigidity is added.

A transverse shaft 22 is mounted in bearing boxes 23 between the tracks and has one end extending through one of said tracks; while a similar transverse shaft 24 is mounted in bearing boxes 25 between the tracks. These shafts underlie the standards and the members 17. Eccentrics 26 are mounted on said shafts and each eccentric 26 is associated with a companion eccentric 27 disposed on the shafts in diametrically opposite relation thereto. By this arrangement when the shafts are rotated the eccentrics 26 are moved in one direction and the eccentrics 27 are moved in the opposite direction.

Each member 17 has an integral ring 28 at its lower end surround one of the eccentrics 26. Jack bars 29 are disposed vertically in guide ways 30 in the platform 10. Each jack bar has an integral ring 31 at its upper end surrounding one of the eccentrics 27, and in its lower end carries a ball caster 32 in a suitable manner. Arms 33 are fastened to the shafts 22 and 24 and are connected by a ring 34 so that when the shaft 22 is rotated, rotation will be communicated to the shaft 24. On the projecting end of the shaft 22 I mount a hand lever 35. A ratchet wheel 36 is also mounted on the shaft 22 in a recess 37 in the side of one of the tracks. A pawl 38 mounted in said recess engages the ratchet.

By swinging the lever downwardly the shaft 22 is rotated and the shaft 24 is also rotated. The eccentrics are so arranged that when said lever is swung downward, the eccentrics 26 will be swung upwardly and the eccentrics 27 downwardly. The result of this is that the jack bars will be moved downwardly into contact with the floor under the platform 10, whereby the latter will be elevated and the ball casters 32 brought into contact with the floor as supports. The members 17 will be elevated whereby the heads 18 will be elevated and the axles of the car engaged, whereby the car will be lifted from the tracks 11. The pawl 38 holds the ratchet 36 and prevents a reverse movement of the parts, whereby they are locked in position.

In using the device the platform 10 normally rests on the floor of the garage and the car is driven onto one of the approaches 13, which is slightly depressed, so that the wheels of the car will pass onto the tracks 11. The car is stopped so that the front and rear axles will be over the heads 18, which latter are long enough to accommodate different lengths of cars. It is merely necessary to swing the lever 35 downwardly to rotate the shafts 22 and 24, whereby the eccentrics 26 will be swung upwardly and the eccentrics 27 downwardly. By this means the jack bars 29 are moved downwardly whereby the platform 10 will be elevated and at the same time the members 17 are lifted vertically through the collars 16, whereby the heads 18 engage the axles of the automobile and raise the wheels from the tracks. The whole load being supported upon the ball casters 32 may be easily turned around or moved in any direction as is obvious. To lower the automobile the pawl 38 is disengaged from the ratchet and the lever 35 swung upwardly whereby the movement of the jack bars and the members 17 is reversed and the parts restored to their normal position. The platform resting on the floor of the garage, the car may be driven from the tracks 11.

It will be seen that the jack bars 29 may be removed if desired and the device used merely to elevate the automobile and not as a turn table.

Various changes in the size and construction of the parts as well as modifications, may be made without departing from the spirit of the invention.

What I claim, is:

1. In an automobile turn table, a platform, tracks mounted on the platform, vertical lifting members, jack bars mounted in the platform, and means for simultaneously moving the jack bars downwardly and the lifting members upwardly.

2. In an automobile turn table, a platform, tracks mounted on the platform, vertical lifting members, jack bars mounted in the platform, means for simultaneously moving the jack bars downwardly and the lifting members upwardly, and inclined approaches hinged to each end of the platform.

3. In an automobile turn table, a platform having tracks, standards mounted on the platform, lifting members movable vertically in the standards, jack bars movable vertically down through the platform and having casters on their lower ends, transverse shafts mounted on the platform, and eccentrics mounted on the shafts and engaging with the lifting members and the jack bars and disposed oppositely so as to simultaneously move the lifting members upwardly and the jack bars downwardly.

4. In an automobile turn table, a platform having tracks, standards mounted on the platform, lifting members movable vertically in the standards, jack bars movable vertically down through the platform and having casters on their lower ends, transverse shafts mounted on the platform, eccentrics mounted on the shafts and engaging with the lifting members and the jack bars and disposed oppositely so as to simultaneously move the lifting members upwardly and the jack bars downwardly, and a ratchet device for holding the lifting members and the jack bars in the position to which they are moved.

5. In an automobile platform device, a platform, standards mounted on the platform, vertical lifting members slidable in the standards, heads mounted on the lifting members, transverse shafts mounted on the platform, a connection between the shafts whereby one moves the other, eccentrics mounted on the shaft and engaging the lifting members, and means for rotating one of the shafts.

In testimony whereof I affix my signature.

ANDY SHUSTER.